April 21, 1959    C. M. L. L. BOURCIER DE CARBON    2,882,592
SHOCK ABSORBERS
Filed Dec. 3, 1957
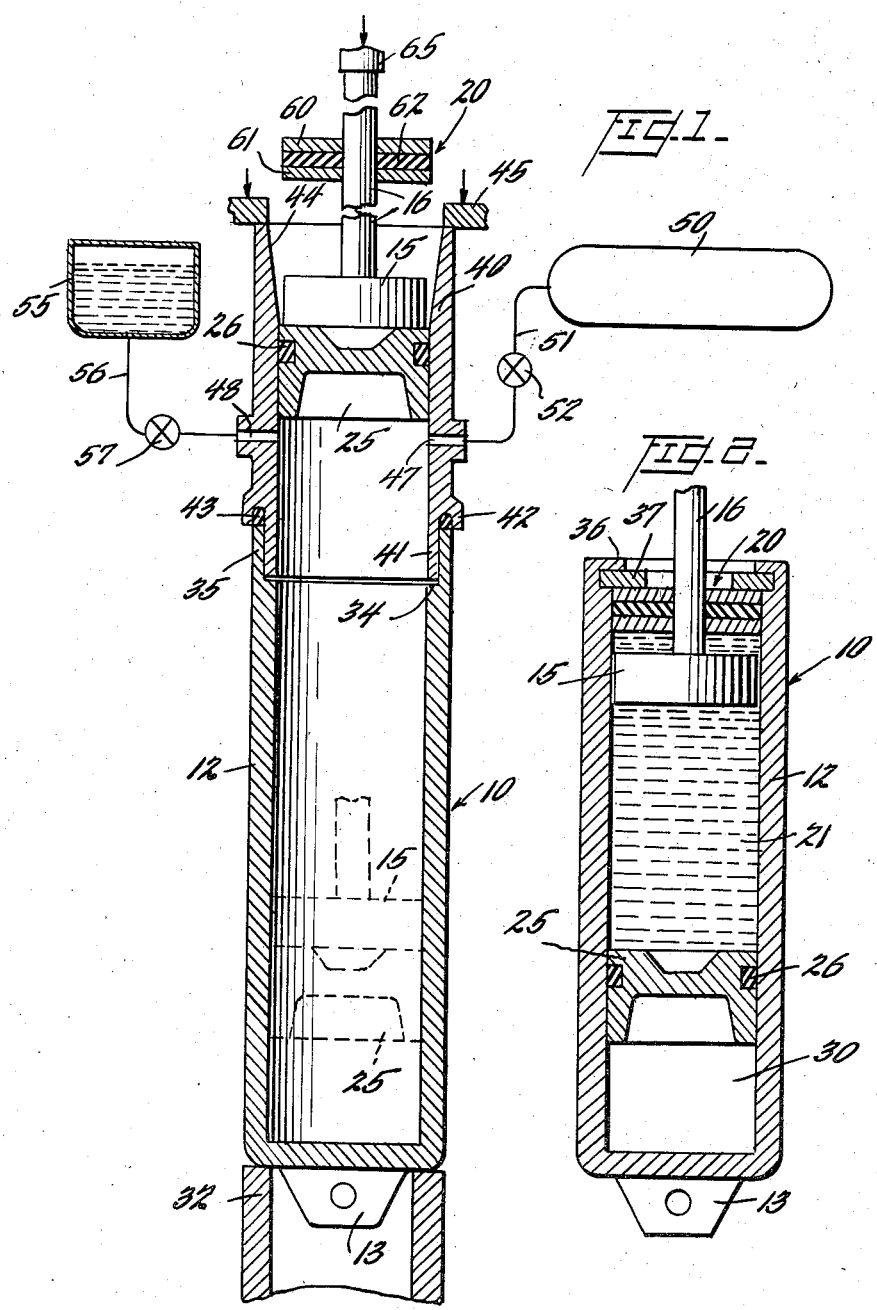
INVENTOR
C. M. L. L. Bourcier de Carbon
BY Watson, Cole, Grindle & Watson
ATTORNEYS

United States Patent Office 2,882,592
Patented Apr. 21, 1959

2,882,592
SHOCK ABSORBERS

Christian M. L. L. Bourcier de Carbon,
Neuilly-sur-Seine, France

Application December 3, 1957, Serial No. 700,362

8 Claims. (Cl. 29—428)

This invention relates to shock absorbers, as for example shock absorbers for vehicle suspensions and the like, and has to do more particularly with methods and apparatus for assembling and pressurizing such shock absorbers.

Hydraulic-pneumatic shock absorbers are already known and in certain types of these there is provided a cylinder containing a liquid in which a working piston can be moved back and forth while a portion of the working liquid is transferred through valved openings or other bypass passageways from one side of the piston to the other, and in which the working fluid is subjected to the effect of a gas under pressure which occupies a part of the cylinder. Of course, the cylinder is connected to one of the two members, the relative movements of which are to be damped, and the piston connected through a piston rod to the other of such members.

Some shock absorbers of this type are constructed so that both the working liquid and the pressure gas are placed together in a single space within the shock absorber casing which is of course finally sealed by means of a tight-fitting end closure generally provided at the end of the casing through which the piston rod extends and is equipped with suitable packing means for the rod. Others are provided with piston-like floating partitions which divide the interior of the casing into two chambers, one filled with the working liquid and the other containing pressure gas.

The introduction of the pressure gas gives rise to certain difficulties in assembling such shock absorbers. It is desirable to avoid providing a bore hole in the shock absorber cylinder equipped with a shut-off valve, for the introduction of the pressure gas since this construction contains the elements of later difficulties. Therefore, proposals have already been made to introduce the gas, in either liquid or solid phase during the construction of the shock absorber, for example, in the form of liquid air or of carbon dioxide flakes, and then when the shock absorber is sealed, the gas will form inside of the closed casing with the development of the desired pressure.

These familiar processes require especial care in the introduction of the liquid or solidified gas, they are accompanied by certain difficulties attendant to the assembly of the shock absorber, and thus they result in relatively high production costs.

It is therefore an object of the present invention to provide a process and apparatus for the introduction of pressure gas during the construction of hydraulic-pneumatic shock absorbers which will eliminate these difficulties and provide means for greatly facilitating the assembly and pressurizing of the device, and at a minimum of expense.

The invention in its preferred embodiment contemplates the provision of a ways and means whereby the gas is introduced in gaseous phase into the shock absorber casing and is accomplished by the use of a novel appliance comprising an auxiliary or extension cylinder with the same internal diameter as the cylindrical shock absorber casing. This extension member is set up in a gas and liquid-tight manner upon the initially open end of the shock absorber casing, the other end of the casing being of solid imperforate construction. This extension device, together with the casing itself, serves as a combined receiving space for the gas which is to be introduced and the extension also serves as a guide for the working piston and the floating partition, as well as the conduit end closure of the shock absorber casing. With one of these mechanical elements positioned in the outer end of the extension member the gas under low pressure (even atmospheric under some circumstances) is introduced to the interior of the assembled members and then by moving the mechanical part which fits snugly in the extension element, downwardly into the casing, the gas is compressed to a rather small volume in the imperforate end of the casing.

Preferably, the gas is introduced under slight initial pressure through an opening in the walls of the extension appliance from a cylinder or other source of pressure gas through a conduit in which a regulating valve may be introduced. However, in certain cases, especially where the cylindrical extension member is of sufficient length, the gas may be introduced at atmospheric pressure and the compression through the entire length of the appliance and the greater portion of the length of the cylinder insures that the ultimate pressure of the gas pocket in the end of the casing is of the proper degree.

In the preferred practice of the invention the partition element is inserted into the appliance first, then the working piston with the piston rod extending outwardly and with the perforated packed end closure surrounding the piston rod. Then the gas is introduced through the opening in the attachment and by the use of a suitable press the piston rod is moved downwardly, pushing the partition element ahead of it into the casing. When both the piston and the partition have entered the casing to the proper degree the working liquid is introduced into the interior of the combined enclosures behind the working piston but in advance of the casing closure. When the piston is filled with the working fluid the casing closure is brought into contact with the surface of the liquid and securely sealed to the open end of the casing, after the appliance has been removed.

The working liquid is introduced through another bore hole in the cylindrical extension member from a suitable reservoir and through a valve controlled conduit whereby the proper measure of liquid may be determined.

Other objects and features of novelty will be apparent from the following specification when read in connection with the accompanying drawings in which one embodiment of the invention is illustrated by way of example.

In the drawings:

Figure 1 is a vertical sectional diagrammatic view of a shock absorber casing to which an appliance involved in the present invention has been applied; and Figure 2 is a similar view of the assembled and pressurized shock absorber.

Referring first to Figure 2 of the drawings, the shock absorber designated generally by the reference numeral 10 comprises a cylindrical casing 12 having means 13 at one end for connection to one of the members, the relative movement of which is to be damped, and having disposed for reciprocation therein a piston 15. A piston rod 16 extends from the piston through a packed end closure assembly 20 and is adapted to be connected to the other of the two relatively movable members.

The piston 15 may be of any suitable or known type, whether constructed in accordance with my Patent No.

2,719,612, granted October 4, 1955, or according to my pending application Serial No. 489,694, filed February 21, 1955; the only criterion being that there must be controlled means for passing working fluid from one side of the piston to the other during operation.

This working fluid indicated at 21 occupies the space between the sealing closure 20 and a floating piston-like partition element 25 which fits snugly within the casing 12 and may even be provided with a packing ring 26.

Beneath the partition 25 is a pressure gas pocket 30 and one function of this pocket is to provide expansion room to accommodate the volume of the piston rod 16 as it progressively enters the shock absorber casing upon the compression stroke of the device.

Of course, ordinarily the shock absorber would be installed in a position inverted from that shown in Figure 2.

Now in pursuing the present invention in order to assemble and pressurize the shock absorber, the casing 12 is disposed with its open end upwardly upon a supporting base member 32 which may be a part of a power press device. In the preferred construction, the upper end of the casing 12 is provided with an inner shoulder 34, a wider mouth portion 35 of the casing extending upwardly beyond said shoulder and adapted to be coined or spun over as shown at 36 in Figure 2 to grip a retaining annulus 37 which serves to prevent the expulsion of the sealing end closure 20 from the casing.

Returning to Figure 1, it will be seen that there is fitted to the upper open end of the casing 12 an appliance which comprises essentially a substantially cylindrical extension member 40 which has an attenuated annular lower end 41 which fits snugly within the mouth portion 35 of the casing, and a shoulder 42 has an annular groove which receives a packing ring 43 whereby the appliance is sealed in a liquid-tight and gas-tight manner to the casing 12. The upper end or mouth of the auxiliary or extension cylinder member 40 is preferably internally flared as at 44 to provide a funnel for facilitating the insertion of the mechanical elements of the shock absorber. In order to retain the appliance firmly in position upon the casing, the press, which contains the device during assembly, is provided with portions 45 which bear downwardly in the direction of the arrows upon the extension member 40.

The member 40 is provided nearer its lower end with a pair of openings in the walls thereof, one indicated at 47 for the admission of gas to the interior of the cylinder, and the other designated 48 for the admission of working fluid. A gas tank containing gas preferably under moderately low pressure is shown at 50 and is connected by means of the conduit 51 with the opening 47. A shut-off valve 52 is provided in the conduit and this valve, or a second valve not shown, may also provide means for regulating and controlling the pressure of the gas fed to the attachment.

A liquid reservoir 55 containing a supply of working liquid is connected by means of a conduit 56 with the opening 48, which conduit is controlled by means of a valve 57.

Now in assembling and pressurizing the shock absorber, after the auxiliary cylinder or extension 40 is secured in fluid-tight relation with the upper end of the casing, the partition member 25 is inserted in the attachment and the working piston 15 applied to its outer surface with the piston rod 16 extending outwardly of the assemblage. The end closure element designated generally by the reference numeral 20 may be applied to the piston rod at this time or later. This closure assembly comprises an outer rigid disc 60 which may be made of metal or other suitable material and an inner disc 61 of like construction. Between these discs is sandwiched a resilient packing or sealing disc 62 which upon insertion is radially expansible against the inner walls of the end portion of the casing 12. One example of this general type of sealing structure is disclosed in my Patent No. 2,765,877, granted October 9, 1956.

At 65 there is suggested a plunger device associated with the press which includes the support 32, which plunger serves to press the piston rod and the other insertable elements downwardly through the appliance 40 into the casing 12 to the desired distance.

With the insertable parts in the approximate position shown in Figure 1, gas is admitted from the tank 50 through the opening 47 and fills the interior of the casing 12 and the appliance 40 at a predetermined moderately low pressure, the gas of course being admitted through valve 52 while the liquid valve 57 is closed. Then the valve 52 is closed and the plunger 65 actuated to move the piston 15 and partition 25 downwardly into the shock absorber casing 12 to the position indicated in broken lines in Figure 1, and thus the pressure gas is compressed to the desired volume and pressure.

If the packing and closure member 20 has already been applied to the rod (which is the preferred procedure) it is retained upon the piston rod near the outer end thereof and above the opening 48. Then with the piston and partition elements in the desired downward position, the valve 57 is open and working liquid from the tank 55 introduced through the opening 48. When the proper amount of liquid has been introduced the valve 57 is closed and the closure element 20 moved downwardly to contact the surface of the liquid and preferably exclude any entrapment of air between the level of the liquid and the member 20. When the member 20 has reached its ultimate point within the cylindrical casing 12 the appliance 40 may be removed, the retaining ring 37 inserted, and the lip 35 of the casing clamped over the ring as shown at 36 in Figure 2.

Alternative methods of assembly and pressurizing may involve the following departures from that just described. The partition 25 and piston 15 may be pressed downwardly after the gas is introduced, until they enter well into the casing 12, whereupon the liquid is introduced, the valve 57 closed, and then by a simultaneous continued movement of the piston 15 and partition 25 the enclosure 20 is moved downward in such a manner that it fits tightly in the auxiliary cylinder 40. Then the pressure needed for further compression of the pressure gas is applied to the closure assembly 20 which serves to crowd the inserted liquid before it and acts through said liquid upon the floating partition 25 so that the latter is moved further downward and the pressure gas compressed to its desired inflation pressure.

In certain cases where the appliance 40 is of sufficient axial length the gas may be inserted at atmospheric pressure and the movement of the compressing parts through the entire length of the appliance 40 and the greater portion of the length of the casing 12 will cause the gas to be compressed to the proper pressure.

After the closure seal member 20 is firmly fixed in place by the flanging-over of the casing onto the retaining annulus 37 the assemblage may be removed from the press support 32 and installed in the motor vehicle or other point of use.

It is understood that various changes and modifications may be made in the embodiments illustrated and described herein without departing from the scope of the invention as defined by the following claims.

Having thus described the invention, what is claimed as new and desired to be secured by Letters Patent is:

1. The method of assembling and pressurizing a combined pneumatic and hydraulic shock absorber having a cylindrical casing permanently closed at one end and initially open at the other, a working piston reciprocable therein, a piston rod secured to said piston and passing through a packed opening in a removable end closure for the initially open end of the casing, a body of working liquid within said casing surrounding the piston, and a portion thereof adapted to pass from one side of the working piston to the other when the piston reciprocates in the casing during operation, and a floating partition member whose outer periphery fits snugly the inner walls of the casing and is adapted to separate the body of working liquid from a body of compressed gas occupying the closed end portion of the casing: said method comprising the steps of applying to the open end of the casing an open-ended cylindrical extension member of the same internal diameter as the shock absorber cylinder and having a gas opening and a liquid opening through the walls thereof, preliminarily inserting said partition member within the outer end portion of said cylindrical extension member, inserting the working piston into said extension member with the attached piston rod outward, applying the end closure to the piston rod with the latter extending through said packed opening, introducing gas under pressure through the gas opening in the wall of said extension member, applying axial pressure to the piston rod thus causing the shock absorber working piston to press upon said partition member and push it through the extension member and well into the shock absorber casing to the point where the gas is further compressed in the closed end of the casing, introducing working liquid through the liquid opening in said extension member into the casing exteriorly of the working piston and between the said piston and the end closure surrounding the piston rod until the casing is filled, then applying the end closure to the open end of the casing, removing the cylindrical extension, and securing the end closure firmly in place.

2. The method of assembling and pressurizing a combined pneumatic and hydraulic shock absorber having a cylindrical casing permanently closed at one end and initially open at the other, a working piston reciprocable therein, a piston rod secured to said piston and passing through a packed opening in a removable end closure for the initially open end of the casing, a body of working liquid within said casing surrounding the piston, and a portion thereof adapted to pass from one side of the working piston to the other when the piston reciprocates in the casing during operation, and a floating partition member whose outer periphery fits snugly the inner walls of the casing and is adapted to separate the body of working liquid from a body of compressed gas occupying the closed end portion of the casing: said method comprising the steps of applying to the open end of the casing an open-ended cylindrical extension member of the same internal diameter as the shock absorber cylinder, preliminarily inserting said partition member within the outer end portion of said cylindrical extension member, inserting the working piston into said extension member with the attached piston rod outward, introducing gas at relatively low pressure into the extension member and said casing, applying axial pressure to the piston rod thus causing the shock absorber working piston to press upon said partition member and push it through the extension member and well into the shock absorber casing, introducing working liquid through said extension member into the casing exteriorly of the working piston until the casing is filled, forcing the end closure through the extension member against the liquid thus applying further pressure to the inner body of gas, then applying the end closure to the open end of the casing with the piston rod extending through the packed opening in said closure, removing the cylindrical extension member, and securing the end closure firmly in place in the end of the casing.

3. The method of assembling and pressurizing a combined pneumatic and hydraulic shock absorber having a cylindrical casing permanently closed at one end and initially open at the other, a working piston reciprocable therein, a piston rod secured to said piston and passing through a packed opening in a removable end closure for the initially open end of the casing, a body of working liquid within said casing surrounding the piston, and a portion thereof adapted to pass from one side of the working piston to the other when the piston reciprocates in the casing during operation, and a floating partition member whose outer periphery fits snugly the inner walls of the casing and is adapted to separate the body of working liquid from a body of compressed gas occupying the closed end portion of the casing: said method comprising the steps of applying to the open end of the casing an open-ended cylindrical extension member of the same internal diameter as the shock absorber cylinder, preliminarily inserting said partition member within the outer end portion of said cylindrical extension member, inserting the working piston into said extension member with the attached piston rod outward, introducing gas at relatively low pressure into the extension member and said casing, applying axial pressure to the piston rod thus causing the shock absorber working piston to press upon said partition member and push it through the extension member and well into the shock absorber casing, the length of said extension member being so selected that the internal volume thereof together with the total volume of the shock absorber casing may contain such quantity of gas at relatively low pressure that it is compressed to its full working pressure by such application of the partition member, introducing working liquid through said extension member into the casing exteriorly of the working piston until the casing is filled, then applying the end closure to the open end of the casing with the piston rod extending through the packed opening in said closure, removing the cylindrical extension, and securing the end closure firmly in place.

4. Apparatus for facilitating the assembling and pressurizing of a combined pneumatic and hydraulic shock absorber having a cylindrical casing permanently closed at one end and initially open at the other, a working piston reciprocable therein, a piston rod secured to said piston and passing through a packed opening in a removable end closure for the initially open end of the casing, a body of working liquid within said casing surrounding the piston, and a portion thereof adapted to pass from one side of the working piston to the other when the piston reciprocates in the casing during operation, and a floating partition member whose outer periphery fits snugly the inner walls of the casing and is adapted to separate the body of working liquid from a body of compressed gas occupying the closed end portion of the casing: said apparatus comprising a press having an article supporting base and a plunger member adapted to be brought to bear upon an article in a direction toward said base, an open-ended cylindrical extension member of the same diameter as the shock absorber casing, said extension member having a flanged lower end adapted to interfit with the open end of said shock absorber casing and carrying a packing element to effect a gas and liquid-tight connection between said casing and said extension member, the lower end of said extension member having a thinner cylindrical configuration to fit within an enlarged end portion of said casing and having an outward shoulder carrying said packing element against which the enlarged end portion of the casing may seal; a gas opening and a liquid opening in the walls of said extension member beyond the end of said casing; a source of gas supply under pressure, and a conduit provided with a pressure regulating valve connecting said source with said gas opening in said extension member; a liquid tank and a valved conduit connecting said liquid tank with said liquid opening in said extension member; said extension having a slightly flared opening in its outer end to facilitate the introduction of inner parts of said shock absorber for passage therethrough in proper sequence with each other and with the gas and liquid supplied to said casing.

5. Apparatus for facilitating the assembling and pressurizing of a combined pneumatic and hydraulic shock absorber having a cylindrical casing permanently closed at one end and initially open at the other, a working piston reciprocable therein, a piston rod secured to said piston and passing through a packed opening in a removable end closure for the initially open end of the casing, a body of working liquid within said casing surrounding the piston, and a portion thereof adapted to pass from one side of the working piston to the other when the piston reciprocates in the casing during operation, and a floating partition member whose outer periphery fits snugly the inner walls of the casing and is adapted to separate the body of working liquid from a body of compressed gas occupying the closed end portion of the casing: said apparatus comprising a press having an article supporting base and a plunger member adapted to be brought to bear upon an article in a direction toward said base, an open-ended cylindrical extension member of the same diameter as the shock absorber casing, said extension member having a lower end adapted to interfit with the open end of said shock absorber casing and carrying a packing element to effect a gas and liquid-tight connection between said casing and said extension member; a gas opening and a liquid opening in the walls of said extension member beyond the end of said casing, a source of gas supply, and a conduit provided with a pressure regulating valve connecting said source with said gas opening in said extension member; a liquid tank and a valved conduit connecting said tank with said liquid opening in the extension member; said extension having a slightly flared opening at its outer end to facilitate the introduction of inner parts of said shock absorber for passage therethrough in proper sequence with each other and with the gas and liquid supplied to said casing.

6. Apparatus for facilitating the assembling and pressurizing of a combined pneumatic and hydraulic shock absorber having a cylindrical casing permanently closed at one end and initially open at the other, a working piston reciprocable therein, a piston rod secured to said piston and passing through a packed opening in a removable end closure for the initially open end of the casing, a body of working liquid within said casing surrounding the piston, and a portion thereof adapted to pass from one side of the working piston to the other when the piston reciprocates in the casing during operation, and a floating partition member whose outer periphery fits snugly the inner walls of the casing and is adapted to separate the body of working liquid from a body of compressed gas occupying the closed end portion of the casing: said apparatus comprising an open-ended cylindrical extension member of the same diameter as the shock absorber casing, said extension member having a flanged lower end adapted to interfit with the open end of said shock absorber casing and carrying a packing element to effect a gas and liquid-tight connection between said casing and said extension member, the lower end of said extension member having a thinner cylindrical configuration to fit within an enlarged end portion of said casing and having an outward shoulder carrying said packing element against which the enlarged end portion of the casing may seal, a gas opening in the walls of said extension member beyond the end of said casing, a source of gas supply, and a conduit provided with a pressure regulating valve connecting said source with said gas opening in said extension member.

7. Apparatus for facilitating the assembling and pressurizing of a combined pneumatic and hydraulic shock absorber having a cylindrical casing permanently closed at one end and initially open at the other, a working piston reciprocable therein, a piston rod secured to said piston and passing through a packed opening in a removable end closure for the initially open end of the casing, a body of working liquid within said casing surrounding the piston, and a portion thereof adapted to pass from one side of the working piston to the other when the piston reciprocates in the casing during operation, and a floating partition member whose outer periphery fits snugly the inner walls of the casing and is adapted to separate the body of working liquid from a body of compressed gas occupying the closed end portion of the casing: said apparatus comprising an open-ended cylindrical extension member of the same diameter as the shock absorber casing, said extension member having a flanged lower end adapted to interfit with the open end of said shock absorber casing and carrying a packing element to effect a gas and liquid-tight connection between said casing and said extension member, a gas opening and a liquid opening in the walls of said extension member beyond the end of said casing; a source of gas supply under pressure, and a conduit provided with a pressure regulating valve connecting said source with said gas opening in said extension member; a liquid tank, and a valved conduit connecting said liquid tank with said liquid opening in said extension member.

8. Apparatus for facilitating the assembling and pressurizing of a combined pneumatic and hydraulic shock absorber having a cylindrical casing permanently closed at one end and initially open at the other, a working piston reciprocable therein, a piston rod secured to said piston and passing through a packed opening in a removable end closure for the initially open end of the casing, a body of working liquid within said casing surrounding the piston, and a portion thereof adapted to pass from one side of the working piston to the other when the piston reciprocates in the casing during operation, and a floating partition member whose outer periphery fits snugly the inner walls of the casing and is adapted to separate the body of working liquid from a body of compressed gas occupying the closed end portion of the casing: said apparatus comprising an open-ended cylindrical extension member of the same diameter as the shock absorber casing, said extension member having a lower end adapted to interfit with the open end of said shock absorber casing and carrying a packing element to effect a gas and liquid-tight connection between said casing and said extension member, a gas opening in the walls of said extension member beyond the end of said casing, and a source of gas supply, and a conduit provided with a pressure regulating valve connecting said source with said gas opening in said extension member.

No references cited.